United States Patent [19]
Suzuki et al.

[11] Patent Number: 5,448,328
[45] Date of Patent: Sep. 5, 1995

[54] VIBRATION DRIVEN SYSTEM

[75] Inventors: Ryuji Suzuki, Yokohama; Mitsuru Shinohara, Tokyo, both of Japan

[73] Assignee: Canon Kabushiki Kaisha, Tokyo, Japan

[21] Appl. No.: 13,331

[22] Filed: Feb. 4, 1993

[30] Foreign Application Priority Data

Feb. 7, 1992 [JP] Japan ................................ 4-022606
Mar. 16, 1992 [JP] Japan ................................ 4-058147

[51] Int. Cl.⁶ .................................................. G03B 3/00
[52] U.S. Cl. ................................ 354/400; 354/195.1; 359/823; 74/625
[58] Field of Search ............... 354/400, 195.1, 195.12; 359/823, 824, 825; 74/625; 475/4, 196, 189

[56] References Cited

U.S. PATENT DOCUMENTS 2,875,646  3/1959  Bucalo ................................ 475/196
3,011,364 12/1961  Mims .................................. 475/196
3,160,031 12/1964  Bugg .................................. 475/196
4,793,689 12/1988  Aoyagi et al. ...................... 350/255
4,890,132 12/1989  Hama ................................. 354/400
5,052,781 10/1991  Iizuka ................................ 359/823
5,061,228 10/1991  Hagqvist ........................... 475/189
5,239,417  8/1993  Eguchi et al. ...................... 359/823

*Primary Examiner*—Russell E. Adams
*Attorney, Agent, or Firm*—Fitzpatrick, Cella, Harper & Scinto

[57] ABSTRACT

Balls are clamped between a first gear driven by an auto-focusing motor and a second gear driven by a manual focusing ring. The balls are arranged to revolve about a given axis. A projection having an elasticity and provided to the second gear itself is brought into contact with a fixing member provided at a predetermined position, so that a clamping force for clamping the balls is generated by the projection.

6 Claims, 7 Drawing Sheets

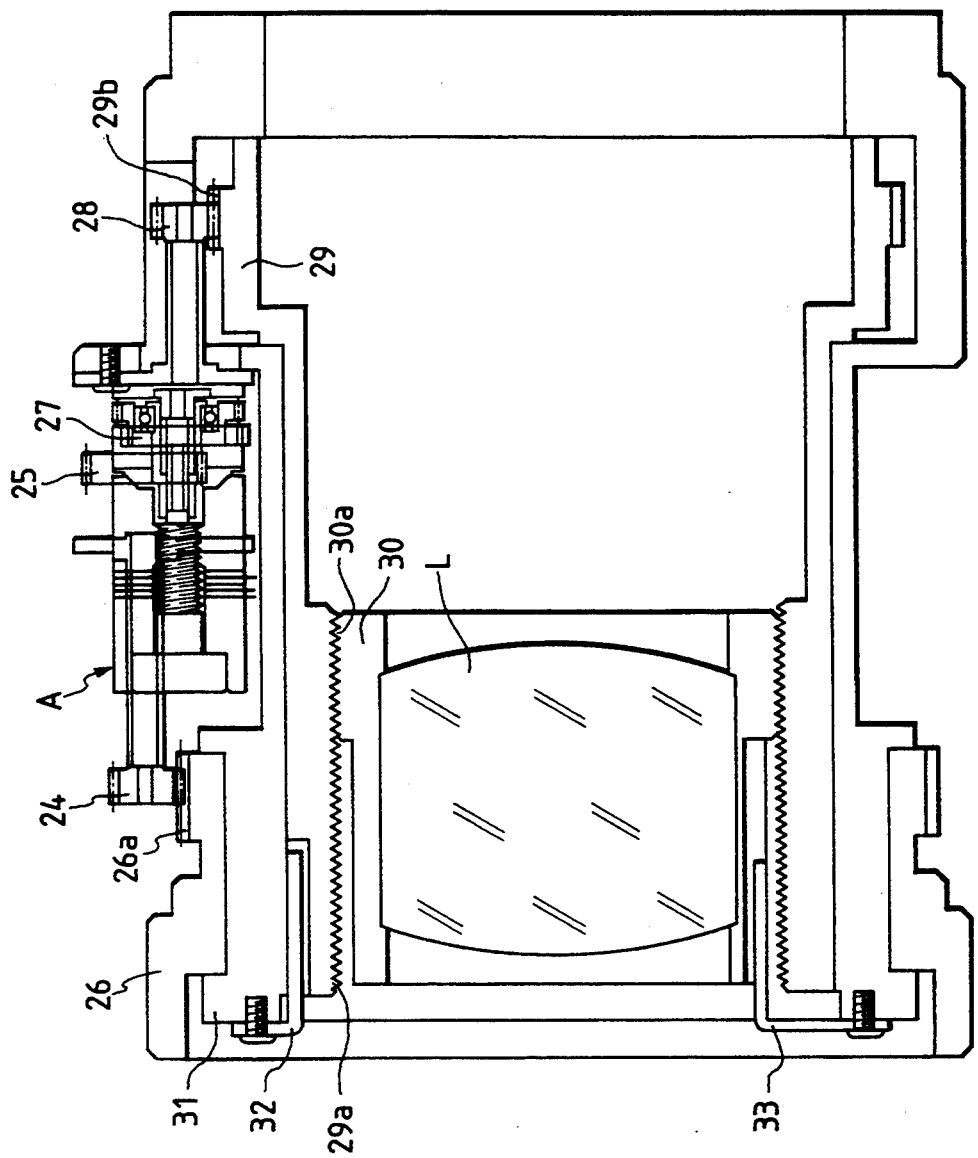

VIBRATION DRIVEN SYSTEM

BACKGROUND OF THE INVENTION

1. Field of the Invention

The present invention relates to a driving apparatus and, more particularly, to a focusing lens driving apparatus, which uses a bar-shaped vibration driven motor as a driving source, and can almost continuously execute an auto-focusing operation and a manual focusing operation without requiring any special switching operation.

2. Description of the Related Background Art

Conventionally, in a known auto-focusing camera, which can selectively perform an auto-focusing operation and a manual focusing operation, when a camera user performs switching from an auto-focusing operation to a manual focusing operation or vice versa, he or she must operate a switching operation member arranged on the outer surface of the camera.

For example, when using a conventional camera, if the camera user operator initially selects an auto-focusing operation in a photographing operation, follows the movement of an object, and then subsequently performs a manual focusing operation with the auto-focusing operation, he or she must operate a switching operation member, and then, pivot a manual operation member arranged on a lens barrel portion of the camera. Thus, the start timing of the manual focusing operation is delayed, and the user may consequently lose a photo opportunity.

Thus, a lens barrel which can perform a motorized auto-focusing operation and a manual focusing operation without requiring any special switching operation was proposed in U.S. Pat. No. 5,052,781.

However, since an ultrasonic wave vibration driven motor (to be referred to as a vibration driven motor hereinafter) used in this prior art has a hollow ring shape, it is expensive and has poor versatility due to its hollow shape.

SUMMARY OF THE INVENTION

It is an object of the present invention to provide a driving apparatus or a lens driving apparatus, which is free from the above-mentioned problems.

It is another object of the present invention to provide a driving apparatus or a lens driving apparatus, which has a simple structure.

It is still another object of the present invention to provide a low-cost vibration wave driven system.

Other objects of the present invention will become apparent from the following detailed description of the present invention.

According to one aspect of the present invention, balls are clamped between a first gear driven by an auto-focusing motor and a second gear driven by a manual focusing ring. The balls are arranged to revolve about a given axis. A projection having an elasticity and provided to the second gear itself is brought into contact with a fixing member provided at a predetermined position, so that a clamping force for clamping the balls is generated by the projection.

BRIEF DESCRIPTION OF THE DRAWINGS

FIG. 3 is a sectional view of a lens barrel having the lens driving apparatus shown in FIG. 1;

DESCRIPTION OF THE PREFERRED EMBODIMENTS

Figure 1:
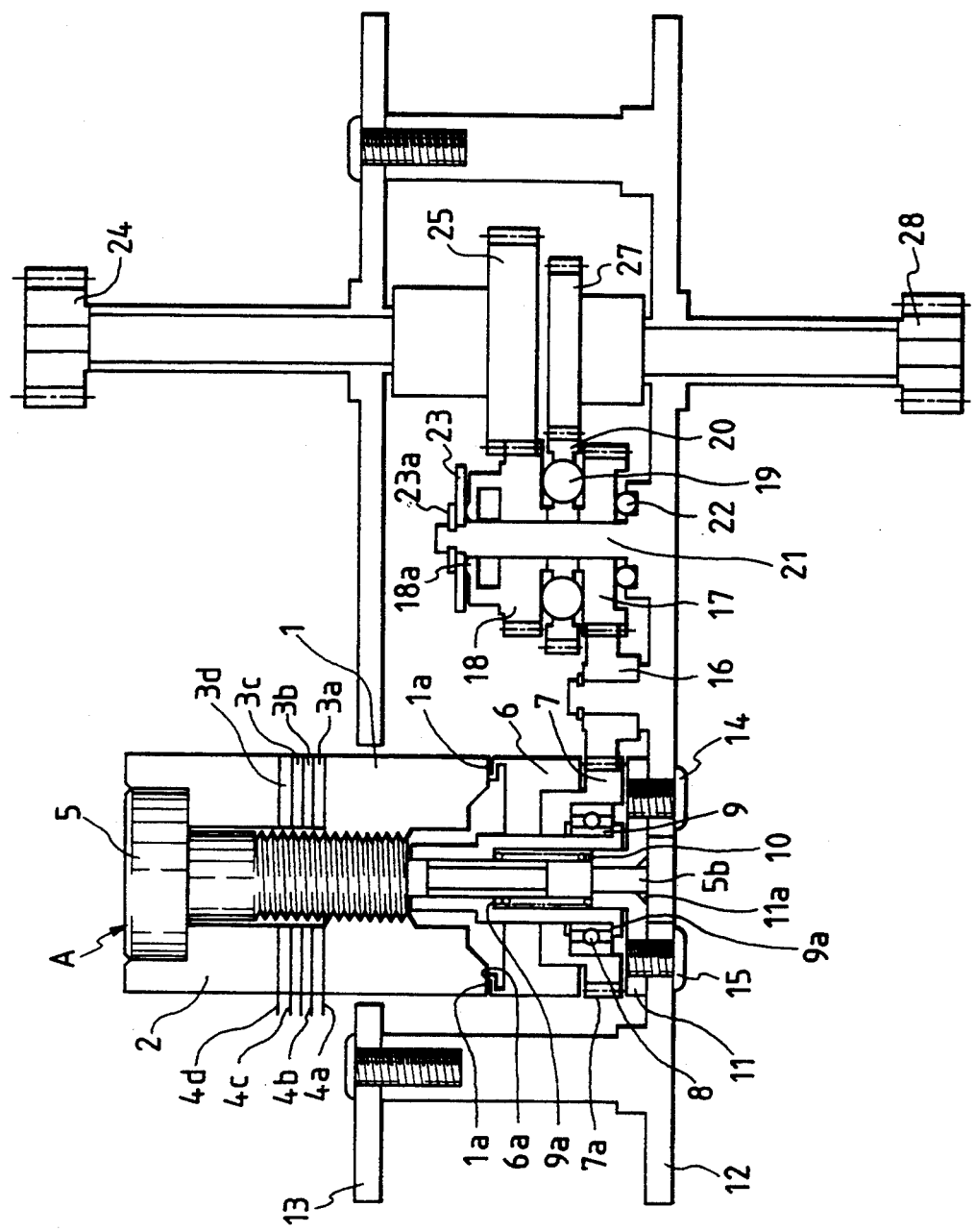
FIG. 1 is a sectional view of a lens driving apparatus according to the present invention.
Figure 2A:
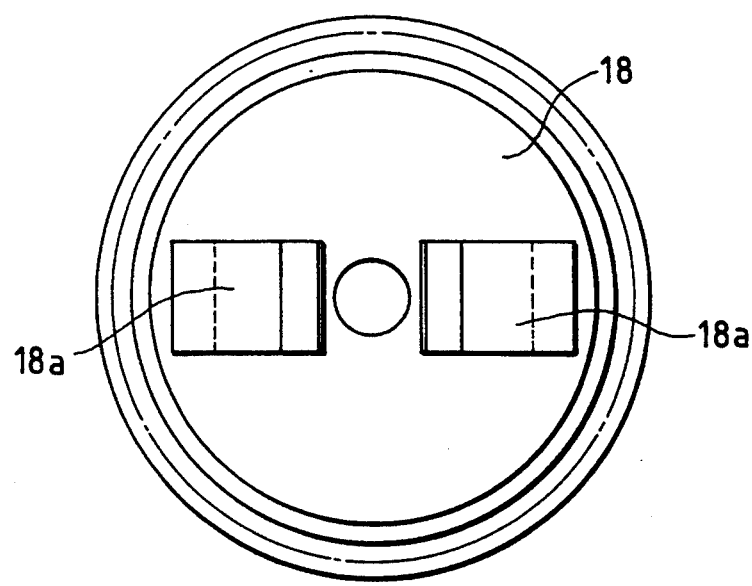
FIGS. 2A and 2B are respectively a front view and a sectional view of a gear 18 used in the arrangement shown in FIG. 1.
Figure 2B:
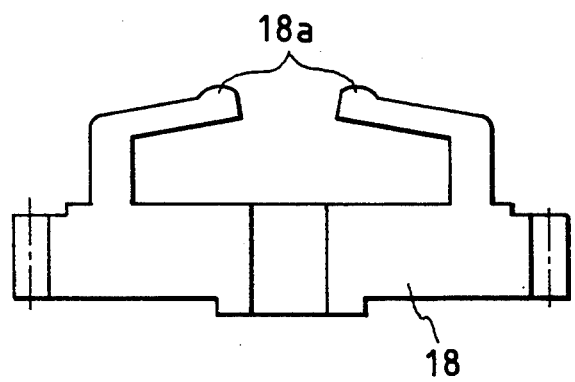

Referring to FIG. 1 and FIGS. 2A and 2B, a stator of a vibration driven motor A includes a columnar vibration elastic member 1 consisting of a metal material, an urging member 2 consisting of a metal material and having the same outer diameter as that of the vibration elastic member 1, ring-shaped piezoelectric element plates 3a to 3d formed to have the same outer diameter as that of the vibration elastic member 1, and electrode plates 4a to 4d for the piezoelectric element plates 3a to 3d. The electrode plates 4a to 4d and the piezoelectric element plates 3a to 3d are arranged between the vibration elastic member 1 and the urging member 2, and a bolt 5 is threadably engaged with the vibration elastic member 1 via the urging member 2 so as to integrally fix the above-mentioned members, thereby constituting the stator.

In the vibration driven motor A, when AC voltages having a phase difference therebetween are applied from a power source circuit (not shown) to the electrode plates 4a to 4d of the stator, the piezoelectric element plates 3a to 3d form mechanical vibrations (i.e., standing waves) in the stator. Upon synthesis of these vibrations, a skip-rope type motion is excited in the stator, thereby frictionally driving a rotor 6 (to be described below), which frictionally contacts the front end portion of the stator. In the rotor 6, a rear end portion (frictional contact portion) 6a contacts a flat portion 1a of the vibration elastic member 1, thereby obtaining a proper frictional force upon compression by a compression spring 10 (to be described later).

A rotary output member 7 consists of a friction stabilizing material, and has a gear 7a. The rear end face of the rotary output member 7 is frictionally coupled to the end face of the rotor 6. The gear 7a is used for transmitting rotation of the rotor 6 to an external mechanism.

A frictional force for frictionally coupling the rotor 6 and the rotary output member 7 is generated by the compression spring 10, and is set to be smaller (i.e., to have a smaller coefficient of friction) than the frictional force between the vibration elastic member 1 and the rotor 6.

More specifically, even when a rotational force is externally applied to the rotary output member 7, the rotor 6 is not rotated because the frictional force for the stator (vibration elastic member 1) is larger than that for the rotary output member 7. Thus the rotary output member 7 alone is rotated.

A bearing 8 is arranged in the inner-diameter portion of the rotary output member 7, and a hollow shaft 9 is fitted in the inner-diameter portion of the bearing 8, thus allowing the rotor 6 and the rotary output member 7 to be rotatable.

The axis of the shaft 9 coincides with that of the stator since the shaft 9 is fitted in a sliding portion 5a of the bolt 5.

The compression spring 10 presses a stepped portion 9a of the shaft 9 to cause a flange portion 9b to press the bearing 8, and this pressing force generates a frictional force between the vibration elastic member 1 and the rotor 6 and between the rotor 6 and the rotary output member 7.

The compression force of the compression spring 10 is generated by inserting a pin portion 5b formed at the distal end portion of the bolt 5 in a hole portion 11a of a flat holding member 11, and fixing it by a known method using, e.g., an adhesive. The arrangement of the vibration driven motor A has been described. The vibration driven motor A is fixed by fixing the holding member 11 to a motor base plate 12 as a fixing member using screws 14 and 15. In this case, it is important to support the stator of the vibration driven motor without adversely affecting a vibration excited in the stator. Since the end of the stator corresponds to a loop position of a vibration, only a radial displacement occurs at this position, and is very small in practice. Therefore, the stator can be fixed using the pin portion 5b as the end of the stator without adversely affecting the vibration of the stator.

A gear 16 transmits rotation of the rotary output member 7 to an AF driving gear 17. The gear 17 transmits rotation received from the gear 16 to ball members 19. A gear 18 transmits an operation amount of a manual operation means (to be described later) to the ball members 19 via gears 24 and 25, which are interlocked with the operation means. Two spring portions 18a are integrally molded on the gear 18, and press the gear 18 via the gear 17 and the ball members 19, thereby generating a frictional force between the gear 17 and the ball members 19 and between the gear 18 and the ball members 19.

The gear 18 is integrally molded of a material, e.g., a moldable polyacetal resin, which can stabilize a frictional sliding motion between itself and a washer 23. The ball members 19 consist of a plurality of balls clamped between the gears 17 and 18, and perform the function of causing a gear 20 to rotate by the rotational forces of the gears 17 and 18 whey they roll and revolve about a gear holding member 21 by the frictional forces of the gears 17 and 18. The gear 20 holds the ball members 19 on its circumferential holes, and is driven when the ball members 19 roll and revolve. Rotation is transmitted from the gear 20 to a lens moving means via gears 27 and 28. The gear shaft (gear holding member) 21 is used for coaxially arranging the gears 17, 18, and 20. The gears 17, 18, and 20 are loosely fitted on the gear shaft 21, and are rotatable with respect to the gear shaft 21. Two flat surfaces are formed on the gear shaft 21 at the mounting position of the washer 23, and hence, the washer 23 is mounted on the gear shaft 21 so as not to be rotatable.

A plurality of ball members 22 define a rolling contact state between the gear shaft 21 and the gear 17 so as to reduce a frictional loss. The washer 23 thrust-fixes the gears 17, 18, and 20, and the ball members 22 to the shaft 21 by, e.g., a spring washer 23a against biasing forces of the spring portions 18a, and is arranged at a position where it can generate a proper frictional force between the ball members 19 and the gear 17 and between the ball members 19 and the gear 18.

The gear 24 is fixed to a fixing shaft of the gear 25, and transmits rotation from the manual operation means. The gear 28 is also fixed to a fixing shaft of the gear 27 as in the gear 25, and transmits rotation from the gear 20 to a lens moving mechanism of the camera.

As shown in FIGS. 2A and 2B, the gear 18 is molded integrally with the plurality of spring portions 18a.

In FIG. 3, a manual operation cylinder 26 has a gear portion 26a for attaining a manual driving operation, which gear portion is meshed with the gear 24. A rotary cylinder 29 has a gear portion 29b for attaining an output driving operation, which gear portion is meshed with the gear 28, so that the cylinder 29 is rotated at a predetermined position. The rotational angle of the cylinder 29 is regulated by a stopper key 32. A helicoid screw portion 29a of the rotary cylinder 29 is helicoid-coupled to a helicoid screw portion 30a of a straight moving cylinder 30, having a lens L, for attaining a focusing zoom operation. A straight moving key 33 for inhibiting rotation is fitted in the straight moving cylinder 30. The motor base plate 12, the straight moving key 33, and the stopper key 32 are fixed to a stationary cylinder 31.

The operations of the motor driving apparatus and the lens barrel will be described in detail below.

In an auto-focusing mode, upon reception of a lens driving signal from a known driving circuit (not shown) provided to the camera mounted with the lens unit shown in FIG. 3, AC voltages are applied to the electrode plates 4a to 4d of the motor A, and the rotor 6 is rotated in a predetermined direction (the rotational direction is defined by, e.g., reversing the advance direction of the phases of the two AC application voltages having a phase difference therebetween), as described above. Upon rotation of the rotor 6, the rotary output member 7 frictionally engaged with the rotor 6 is also rotated, and the rotation output is transmitted in the order of the gear 16→the gear 17.

In this case, the frictional resistance between the gear 17 and the gear holding member 21 is considerably smaller than that of the rotary cylinder 29 since a rolling contact state is defined by the ball members 22. Since the ball members 19 are clamped between the gears 17 and 18, and are pressed by the spring portions 18a, a frictional force acts between the gear 17 and the ball members 19 and between the gear 18 and the ball members 19. The manual operation cylinder 26 interlocked with the gear 18 has a frictional resistance larger than that between the gear 18 and the ball members 19, and is not rotated in the auto-focusing mode. Therefore, the gear 18 is not rotated, and the rotation of the gear 17 is transmitted to the ball members 19. Thus, the ball members 19 roll and revolve about the gear shaft 21, thereby driving the gear 20. Then, rotation is transmitted in the order of the gear 20→the gear 27→the gear 28. Upon rotation of the gear 28, the rotary cylinder 29 is rotated at the predetermined position, and the straight moving cylinder 30, which is helicoid-coupled to the rotary cylinder 29, moves straight by an amount according to the above-mentioned lens driving signal, while being guided along the straight moving key 33, thus attaining an auto-focusing operation.

On the other hand, in a manual focusing mode, when a rotational force is externally applied to the manual operation cylinder 26, rotation is transmitted to the gear 24 meshed with the gear portion 26a of the manual operation cylinder 26, and is then transmitted in the order of the gear 25→the gear 18. Contrary to the auto-focusing operation, since the frictional resistance between the rotor and the stator of the vibration driven motor A is larger than that between the gear 17 and the ball members 19, the gear 17 is not rotated, and rotation of the gear 18 is transmitted to the ball members 19 by the frictional force between the gear 18 and the ball members 19. Then, the ball members 19 roll and revolve about the gear shaft 21, thereby driving the gear 20. Like in the auto-focusing operation, rotation is transmitted in the order of the gear 27→the gear 28, and the rotary cylinder 29 is rotated at the predetermined position. The straight moving cylinder 30 then moves straight, thus attaining a manual focusing operation.

In this embodiment, since the gear 18 is molded using a frictional sliding operation stabilizing material (e.g., a polyacetal resin), the frictional sliding movement on the contact surface between the spring portions 18a of the gear 18 and the washer 23 is stabilized in the manual focusing operation. Therefore, the manual operation cylinder 26 can be smoothly pivoted.

In this embodiment, the gear ratio of the gear 17 to the gear 21 and that of the gear 18 to the gear 21 are designed to be 2:1, respectively.

As described above, the lens driving apparatus of this embodiment has the following structure. That is, the output gear (third gear) 20 having the ball members in its circumferential holes is pressed between the AF driving gear (first gear) 17 and the manual driving gear (second gear) 18 through the ball members, and the ball members are caused to revolve about the shaft to drive the output gear. Therefore, by using the lens barrel incorporating the lens driving apparatus of this embodiment, when a manual focusing operation is to be performed immediately after an auto-focusing operation, the auto-focusing operation can be switched to the manual focusing operation by pivoting only the manual operation member without requiring any other operations (e.g., without operating an auto/manual switching operation member of a conventional camera). Therefore, a photographer can take a desired photograph without losing a shutter chance.

When an arrangement wherein the AF driving gear 17, the manual driving gear 18, and the output gear 20 are coaxially arranged is adopted, a compact structure having the above-mentioned function can be stored in a motor driving unit, and hence, the lens barrel can be made more compact.

In the apparatus of this embodiment, since the compression forces between the first gear 17, the second gear 18, and the ball members 19 are generated by the spring portions (elastic portions) 18a integrally formed on the second gear, a new compression member need not be added. When the second gear consists of a frictional sliding movement stabilizing material (molding resin: polyacetal), manual operation feeling can be improved, and a reduction in cost and improvement of space factor can also be attained.

The present invention is not limited to a camera, but may also be applied to any other systems for automatically or manually driving movable members.

The above-mentioned spring portions may be integrally formed on the first gear in place of the second gear so as to obtain the same effect as described above.

Figure 4:
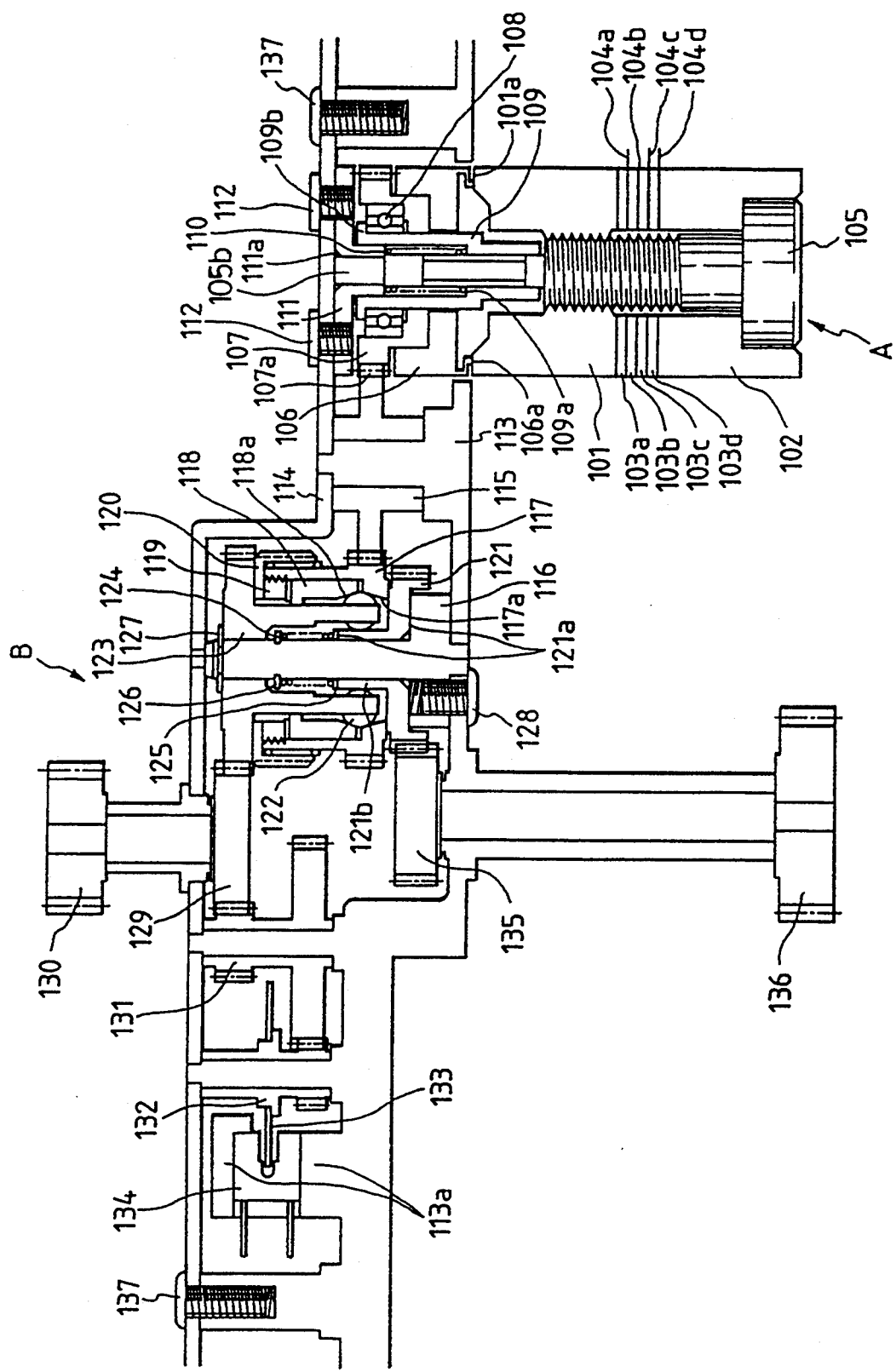
FIG. 4 is a sectional view showing an apparatus according to another embodiment of the present invention.
Figure 5:
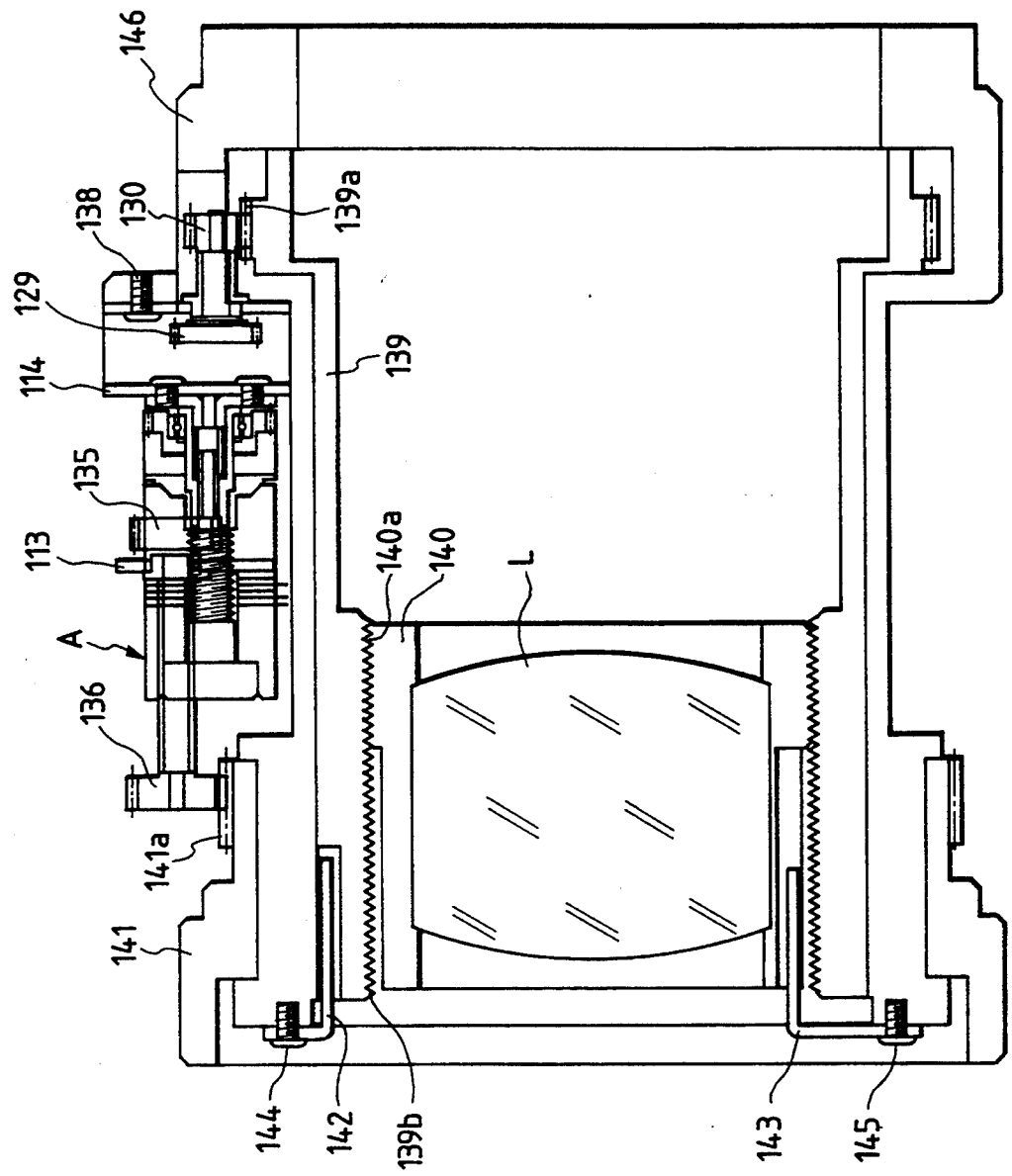
FIG. 5 is a sectional view showing a state wherein the apparatus shown in FIG. 4 is assembled in a lens barrel.

FIG. 4 is a sectional view showing another embodiment of the present invention. FIG. 5 shows an embodiment wherein the apparatus shown in FIG. 4 is applied to a lens barrel.

Referring to FIG. 4, a stator of a vibration driven motor A includes a columnar vibration elastic member 101 consisting of a metal material, an urging member 102 consisting of a metal material and having the same outer diameter as that of the vibration elastic member 101, ring-shaped piezoelectric element plates 103a to 103d formed to have the same outer diameter as that of the vibration elastic member 101, and electrode plates 104a to 104d for the piezoelectric element plates 103a to 103d. The electrode plates 104a to 104d and the piezoelectric element plates 103a to 103d are arranged between the vibration elastic member 101 and the urging member 102, and a bolt 105 is threadably engaged with the vibration elastic member 101 via the urging member 102 so as to integrally fix the above-mentioned members, thereby constituting the stator.

In the vibration driven motor A, when AC voltages having a phase difference therebetween are applied from a power source circuit (not shown) to the electrode plates 104a to 104d of the stator, the piezoelectric element plates 103a to 103d form mechanical vibrations in the stator. Upon synthesis of these vibrations, a skip-rope like motion is excited in the stator, thereby frictionally driving a rotor 106 (to be described below), which frictionally contacts the front end portion of the stator. In the rotor 106, a rear end portion (frictional contact portion) 106a contacts a driving surface 101a of the vibration elastic member 101, thereby obtaining a proper frictional force upon compression by a compression spring 110 (to be described later).

A rotary output member 107 has a gear portion 107a, and is coupled to the rotor 106 to be rotated together. The member 107 transmits rotation of the rotor 106 to an external mechanism.

A bearing 108 is arranged in the inner-diameter portion of the rotary output member 107, and a hollow shaft 109 is fitted in the inner-diameter portion of the bearing 108, thus allowing the rotor 106 and the rotary output member 107 to be rotatable.

The axis of the shaft 109 coincides with that of the stator since the shaft 109 is fitted in a holding member 111 (to be described later). The compression spring 110 presses a stepped portion 109a of the shaft 109 to cause a flange portion 109b to press the bearing 108, and this pressing force generates a frictional force between the vibration elastic member 101 and the rotor 106.

The compression force of the compression spring 110 is generated by inserting a pin portion 105b formed at the distal end portion of the bolt 105 in a hole portion 111a of the flat holding member 111, and fixing it by a known method using, e.g., an adhesive. The arrangement of the vibration driven motor A has been described.

The vibration driven motor A is fixed by fixing the holding member 111 to a metal base plate 114 (to be described later) using screws 112. In this case, it is important to support the stator of the vibration driven motor without adversely affecting a vibration excited in the stator. Since the end of the stator corresponds to a loop position of a vibration, only a radial displacement occurs at this position, and is very small in practice. Therefore, the stator can be fixed using the holding member 111 as the end of the stator without adversely affecting the vibration of the stator.

A gear base plate 113 is molded integrally with a gear shaft, a bearing, and the like. The metal base plate 114 fixes the vibration driven motor A, and clamps gears between itself and the gear base plate 113. A connecting gear 115 transmits rotation of the rotary output member 107 to a gear 117. The gear 117 is fitted on a gear shaft 116, has a tapered inner circumferential surface 117a contacting ball members 122, and receives rotation from the gear 115. An outer member 118 radially compresses and clamps the ball members 122 between a gear 121, and the gear 117 and its tapered inner circumferential surface 118a. A compression member 119 generates a frictional force between the outer member 118 and the gear 117, and the ball members 122, and between the gear 121 and the ball members. The compression member 112 119 also compresses in the axial direction, so that the outer member 118 and the gear 117 are rotated integrally. A cap 120 integrates the outer member 118, the gear 117, and the compression member 119.

The gear 121 is rotated upon reception of the rotation of a gear 135. The ball members 122 are radially compressed and clamped between a shaft portion 121b of the gear 121, and the outer member 118 and the gear 117, and revolve around the shaft portion 121b about the gear shaft 116, thereby driving a retainer gear 123. In this embodiment, at least three ball members 122 are arranged on a concentric circle. The retainer gear 123 holds the ball members 122, so as to transmit only rotation of the ball members 122 about the gear shaft 116. A friction spring 124 generates a frictional force between the gear shaft 116 and the gear 121. Washers 125 and 126 axially fix the friction spring 124, and a washer 127 axially fixes the above-mentioned members 117 to 123. In this manner, a driving force transmission mechanism unit B is constituted, and is fixed to the gear base plate 113 by a screw 128. Gears 129 and 130 serve as output members for transmitting rotation to a rotary cylinder 139 (to be described later), and gears 131 and 132 transmit rotation to a pulse plate 133. The pulse plate 133 is fixed to the gear 132, and is rotated integrally with the gear 132. An interrupter 134 is fixed to an interrupter fixing portion 113a of the gear base plate 113, and transmits a signal from the pulse plate to a lens driving control circuit (not shown). Gears 135 and 136 serve as input members for transmitting rotation of, e.g., a manual operation member 141 to the gear 121. A screw 137 fixes the gear base plate 113 and the metal base plate 114.

The gear 117, the outer member 118, the compression member 119, the cap 120, the gear 121, the ball members 122, the retainer gear 123, and the friction spring 124 are integrally assembled around the gear shaft 116 between the gear base plate 113 and the metal base plate 114, thus constituting a unit structure. For this reason, a variation in rotational force of the retainer gear 123 as the output member can be controlled in the unit structure.

Referring to FIG. 5, the rotary cylinder 139 has a gear portion 139a for attaining an output driving operation, which gear portion is meshed with the gear 130. The rotary cylinder 139 is rotated to a predetermined position, and its rotational angle is regulated by a stopper key 142. A helicoid screw 139b of the rotary cylinder 139 is helicoid-coupled to a helicoid screw portion 140a of a straight moving cylinder 140, having an lens L, for attaining a focusing operation. A straight moving key 143 for inhibiting rotation is fitted in the straight moving cylinder 140. A manual operation member 141 has a gear portion 141a for attaining a manual focusing operation, and the gear portion 141a is meshed with the gear 136. The metal base plate 114, the stopper key 142, and the straight moving key 143 are fixed to a stationary cylinder 146 by screws 138, 144, and 145.

The operations of the driving force transmission apparatus and the lens barrel will be described in detail below with reference to FIGS. 4 and 5.

In an auto-focusing mode, upon reception of a lens driving signal from a driving circuit (not shown) provided in a camera (not shown), AC voltages are applied to the electrode plates 104a to 104d of the motor A, and the rotor 106 is rotated in a predetermined direction (the rotational direction is defined by, e.g., reversing the advance direction of the phases of the two AC application voltages having a phase difference therebetween), as described above. Upon rotation of the rotor 106, the rotary output member 107 coupled to the rotor 106 to be rotated together therewith is also rotated, and rotation is transmitted to the gear 117 via the gear 115. Thus, the outer member 118 integrally assembled with the gear 117 is also rotated. In this case, a frictional force generated upon compression by the compression member 119 acts between the outer member 118 and the gear 117, and the ball members 112.

In this case, a frictional force is generated by the friction spring 124 between the gear 121 and the gear shaft 116, and is a holding force larger than the frictional force between the shaft portion 121b of the gear 121 and the ball members 122. For this reason, the gear 121 is not rotated in the auto-focusing mode. Therefore, since the ball members 122 roll and revolve around the shaft portion 121b of the gear 121 about the gear shaft 116, the retainer gear 123 is driven thereby, and rotation is transmitted to the gears 129 and 130. The rotary cylinder 139 interlocked with the gear 130 is rotated at the predetermined position, and the straight moving cylinder 140, which is helicoid-coupled to the rotary cylinder 139, is moved straight while being guided along the straight moving key 143, thus attaining an auto-focusing operation.

On the other hand, in a manual focusing mode, when a rotational force is externally applied to the manual operation member 141, the gear 136 meshed with the gear portion 141a of the manual operation member 141 is rotated, and the gears 135 and 121 are also rotated in cooperation with the gear 136. In this case, a frictional force generated upon compression of the compression member 119 acts between the shaft portion 121b of the gear 121 and the ball members 122. Contrary to the auto-focusing operation, since the frictional force between the rotor 106 and the stator 101 of the vibration driven motor A is larger than that between the gear 117 and the outer member 118, and the ball members 122, the gear 117 and the outer member 118 are not rotated.

Therefore, upon rotation of the gear 121, the ball members 122 roll and revolve around the shaft portion 121b of the gear 121 about the gear shaft 116, and the retainer gear 123 is driven, thereby operating the gear 129→the gear 130→the rotary cylinder 139→the straight moving cylinder 140 like in the auto-focusing operation, thus attaining a manual focusing operation.

Figure 6:
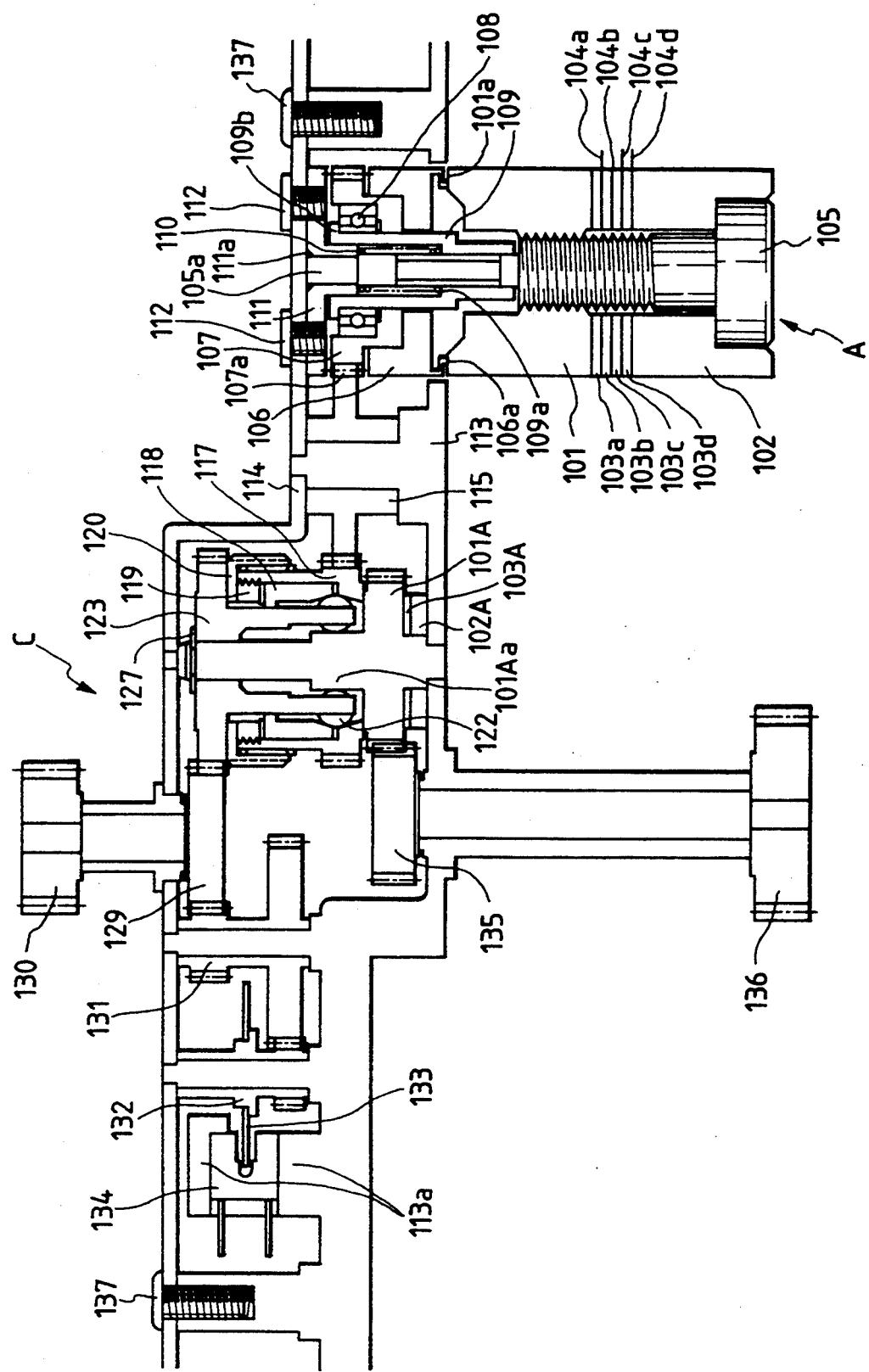
FIG. 6 is a sectional view showing still another embodiment of the present invention.

FIG. 6 is a sectional view showing still another embodiment of the present invention.

Since this embodiment is substantially the same as the embodiment shown in FIG. 4, except for components of the driving force transmission mechanism B, the same reference numerals in FIG. 6 denote the same parts as in FIG. 4, and a detailed description thereof will be omitted. The driving force transmission mechanism of this embodiment will be referred to as a mechanism C hereinafter.

Referring to FIG. 6, a gear 101A is formed integrally with a shaft, which is rotatably fitted in hole portions of a gear base plate 113 and a metal base plate 114. A gear compression member 102A consisting of silicone rubber, and a friction sheet 103A give a frictional force to the gear 101A, and this force is larger than the frictional force between a shaft portion 101Aa of the gear 101A and ball members 122. Therefore, in an auto-focusing operation (when a gear 117 is rotated), the gear 101A is not rotated.

The operation will be described below. In an auto-focusing mode, like in the embodiment shown in FIG. 4, the gear 117 is rotated upon rotation of a rotary output member 107 of a motor A, and rotation is transmitted in the order of the ball members 122→a retainer gear 123. Then, rotation is transmitted in the order of a gear 129→a gear 130→a lens driving mechanism, thus attaining an auto-focusing operation. In this case, in this embodiment, the gear 101A is prevented from rotating as described above.

In a manual focusing mode, like in the embodiment shown in FIG. 4, when a manual operation member is pivoted, rotation is transmitted in the order of a gear 136→a gear 135, and the gear 101A is rotated. The ball members 122 revolve while being rotated on the circumferential surface of the shaft portion 101Aa of the gear 101A, so as to transmit rotation output to the retainer gear. In this case, a proper load acts based on the frictional force of the gear compression member 102A and the friction sheet 103A, which applies the holding force to the gear 101A in the auto-focusing mode, thus providing a good manual operation feeling.

Figure 7:
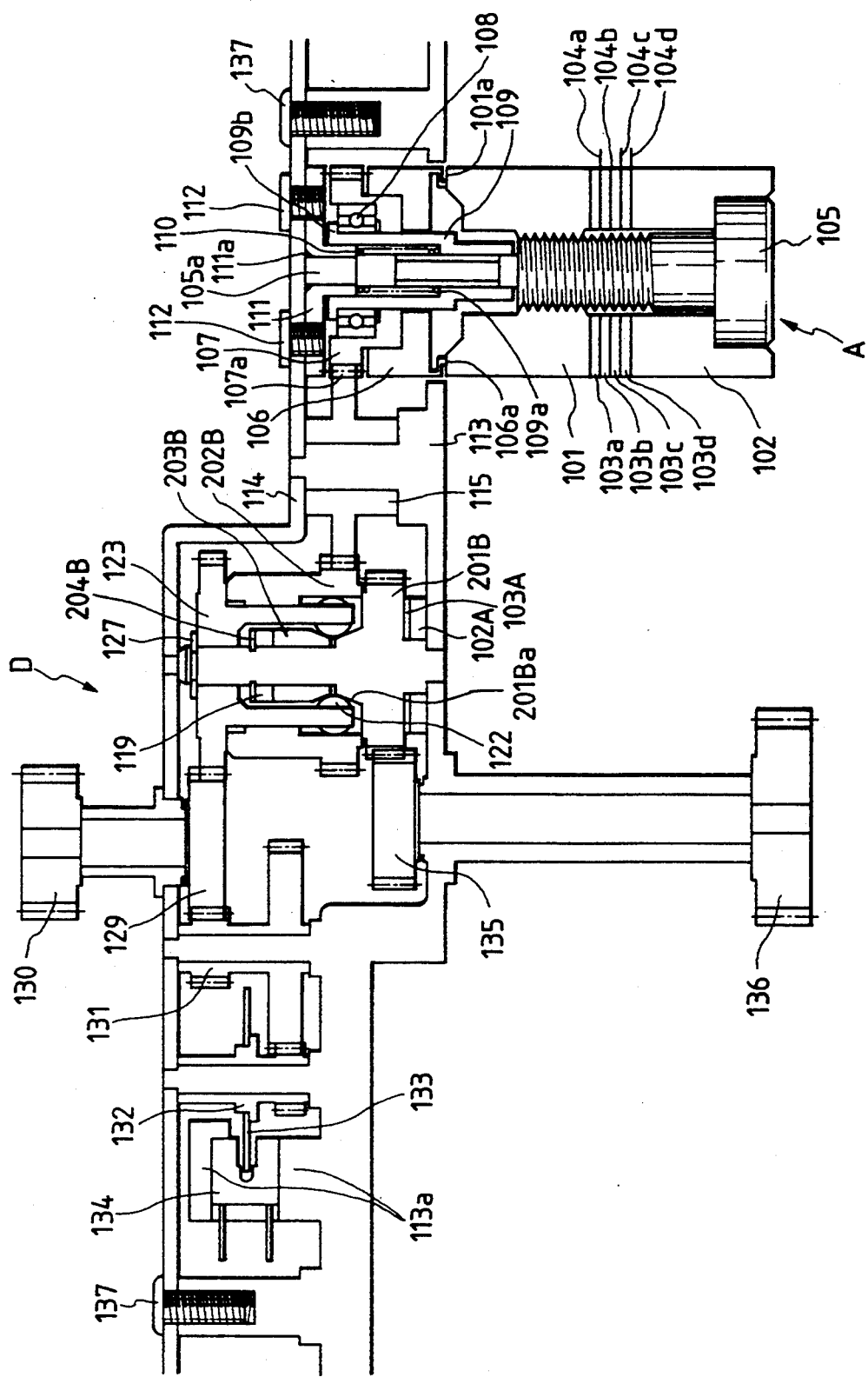
FIG. 7 is a sectional view showing still another embodiment of the present invention.

FIG. 7 is a sectional view showing still another embodiment of the present invention.

Since this embodiment is substantially the same as the embodiments shown in FIGS. 4 and 6, except for components of a driving force transmission mechanism D, the same reference numerals in FIG. 7 denote the same parts as in FIGS. 4 and 6, and a detailed description thereof will be omitted.

A gear 201B is formed integrally with a shaft, and has a tapered portion 201Ba for pressing ball members 122. The gear 201B is rotatably fitted in hole portions of a gear base plate 113 and a metal base plate 114. A pressing member 203B is pressed by a compression member 119, and radially presses the ball members 122 by a tapered portion of its circumferential surface against a gear 202B together with the gear 201B. The pressing member 203B is rotated together with the gear 201B by a frictional force between itself and the compression member 119. A washer 204B is used for axially fixing the compression member 119.

In this embodiment, contrary to the embodiment shown in FIG. 4 wherein a V-groove is formed at the outer circumferential surface side of the ball members 122 to compress and clamp the ball members from the outer circumferential surface side, the V-groove is formed at the shaft side, and the ball members are compressed from the inner circumferential surface side. However, the operation of this embodiment is the same as that in the embodiment shown in FIG. 4.

As in each of the embodiments shown in FIGS. 1 to 7, when a first external input member, a second external input member, a rotary output member, and the like are coaxially arranged to constitute a unit structure, they can be easily assembled in any mechanical sequences (gear trains).

Furthermore, axial input members are frictionally rotated by rotating the external input member, and the rotational forces of the axial input members vary individually. However, since a frictional force for preventing the frictional rotation can be controlled in a unit structure, the individual frictional forces can be easily adjusted, and a variation in frictional torque can be minimized. Furthermore, no special anti-rotation frictional mechanism need be provided to a manual operation member side.

What is claimed is:

1. A device comprising:
   a driving source having a rotation center and a driving power transmitting member;
   a manual operating member having a rotation center;
   a first rotary member arranged to be rotated by the transmitting member;
   a second rotary member arranged to be rotated by said manual operating member;
   a rolling member arranged in contact with said first and second rotary members; and
   a third rotary member arranged to be rotated by rotation of the rolling member;
   wherein said first and second rotary members and said rolling member have a common rotation center, and the common rotation center is arranged at a position different from a position of the rotation center of said driving source and a position of the rotation center of the manual operating member.

2. A device according to claim 1, wherein said driving source includes an electrical motor.

3. A device according to claim 2, wherein said electrical motor driver includes a vibration wave driven motor in response to an alternating signal applied thereto.

4. A device according to claim 1, wherein said rolling member includes a plurality of balls.

5. A system having a movable member, comprising:
   a driving source having a rotation center and a driving power transmitting member;
   a manual operating member having a rotation center;
   a first rotary member arranged to be rotated by the transmitting member;
   a second rotary member arranged to be rotated by said manual operating member;
   a rolling member arranged in contact with said first and second rotary members; and
   a third rotary member arranged to be rotated by rotation of the rolling member to drive said movable member;
   wherein said first and second rotary members and said rolling member have a common rotation center, and the common rotation center is arranged at a position different from a position of the rotation center of said driving source and the rotation center of the manual operating member.

6. A system according to claim 5, wherein said driving source includes an electrical motor.

* * * * *

UNITED STATES PATENT AND TRADEMARK OFFICE
CERTIFICATE OF CORRECTION

PATENT NO. : 5,448,328
DATED : September 5, 1995
INVENTOR(S) : Suzuki et al

It is certified that error appears in the above-indentified patent and that said Letters Patent is hereby corrected as shown below:

Column 1

Line 23, "user" should be deleted; and
Line 28, "Then," should read --then--.

Column 3

Line 47, "whey" should read --when--.

Column 5

Line 43, "shutter chance." should read --photo opportunity.--.

Column 7

Line 13, "members." should read --members 122.--;
Line 14, "112" should be deleted; and
Line 62, "an" should read --a--.

UNITED STATES PATENT AND TRADEMARK OFFICE
CERTIFICATE OF CORRECTION

PATENT NO. : 5,448,328
DATED : September 5, 1995
INVENTOR(S) : Suzuki et al

It is certified that error appears in the above-indentified patent and that said Letters Patent is hereby corrected as shown below:

<u>Column 10</u>

Line 39, "driver" should be deleted; and
Line 40, "motor" should read --motor driven--.

Signed and Sealed this

Nineteenth Day of December, 1995

Attest:

BRUCE LEHMAN

Attesting Officer

Commissioner of Patents and Trademarks